United States Patent [19]
Barth

[11] 3,863,951
[45] Feb. 4, 1975

[54] BEARING SEAL FOR ARTICULATED VEHICLE

[75] Inventor: John W. Barth, Topeka, Kans.

[73] Assignee: Allis-Chalmers Corporation, Milwaukee, Wis.

[22] Filed: June 25, 1973

[21] Appl. No.: 373,520

[52] U.S. Cl............................. 280/400, 180/51
[51] Int. Cl............................. B62d 53/02
[58] Field of Search............ 280/400, 492; 180/51; 403/143, 149, 161; 308/36.1; 287/88, 95

[56] References Cited
UNITED STATES PATENTS

| | | |
|---|---|---|
| 2,452,352 | 10/1948 | Booth .............................. 308/36.1 |
| 3,390,922 | 7/1968 | Reinsma .............................. 277/95 |
| 3,411,809 | 11/1968 | Kampert et al. .................... 280/400 |
| 3,433,502 | 3/1969 | Omon .................................. 280/400 |
| 3,711,121 | 1/1973 | Molby ................................. 280/400 |

Primary Examiner—Trygve M. Blix
Assistant Examiner—Stuart M. Goldstein
Attorney, Agent, or Firm—Arthur L. Nelson

[57] ABSTRACT

A bearing for an articulated vehicle having a flexible sealing member retained by the bearing means and engaging one of the support members to provide a sealed bearing compartment. The bearing is self-aligning and accordingly any momentary misalignment is accommodated by flexing of the sealing member.

10 Claims, 2 Drawing Figures

PATENTED FEB 4 1975 3,863,951

BEARING SEAL FOR ARTICULATED VEHICLE

This invention relates to a bearing and more particularly to a bearing for an articulated vehicle. The bearing includes a flexible element retained by bearing members biased to an engaging position with one of the support members to form a sealed bearing compartment.

Construction machinery, particularly the earthmoving equipment such as front-end loaders, are often constructed as an articulated vehicle. The articulated vehicle is more maneuverable than the conventional four-wheeled vehicle having an automotive type steering mechanism. The articulated vehicle, however, requires a hinged portion interconnecting the front and rear sections. These bearings must provide self-aligning means since the bearing load is not only a thrust load, but is also a radial load which tends to cause misalignment of the bearing. A self-aligning bearing including bushings defining spherical segments adapt themselves well to this type of a bearing since they provide a combination thrust and radial loading to maintain the alignment of the bearing even though the bearings are subjected to radial loading as well as axial thrust loading during their operation.

It is furthermore fundamental that a bearing of this type must be well lubricated and because of the environment in which a bearing operates it is necessary that the foreign material such as sand and grit, dirt and grime be excluded from the bearing assembly since this will soon cause an eroding and grinding on the bearing surfaces and cause failure of the bearings. Accordingly, this invention provides a sealed bearing compartment which seals the self-aligning bushings from the outside to prevent foreign material from entering the bearing compartment. A grease fitting with suitable passage means is also provided to supply lubrication to the bearing compartment when the vehicle is serviced.

It is an object of this invention to provide a sealed bearing compartment for self-aligning bushings of the bearing connecting the sections of an articulated vehicle.

It is another object of this invention to provide a sealed bearing compartment for the bearing pivotally connected to the articulating sections of an articulated vehicle.

It is a further object of this invention to provide a sealed bearing compartment of the bearings interconnecting the sections of an articulated vehicle with a resilient sealing element resiliently biased to an engaging position with the housing of the bearing members to provide an enclosed sealed bearing compartment.

The objects of this invention are accomplished by providing two self-aligning bearings interconnecting the sections of an articulated vehicle. Each self-aligning bearing includes a concave bushing defining a segment of a spherical surface and a mating convex bushing defining a segment of a spherical surface received in the concave bushing. A flexible member is retained by the bearing structure and extends radially to engage in annular surface on a bearing retainer to thereby define a sealed lubricating compartment for the self-aligning bearing to pivotally connect the two sections of the articulated vehicle. A grease fitting with suitable passage means is provided to supply lubrication to the sealed compartment to lubricate the bearing assembly.

The preferred embodiment of this invention is illustrated in the attached drawings.

Figure 1:
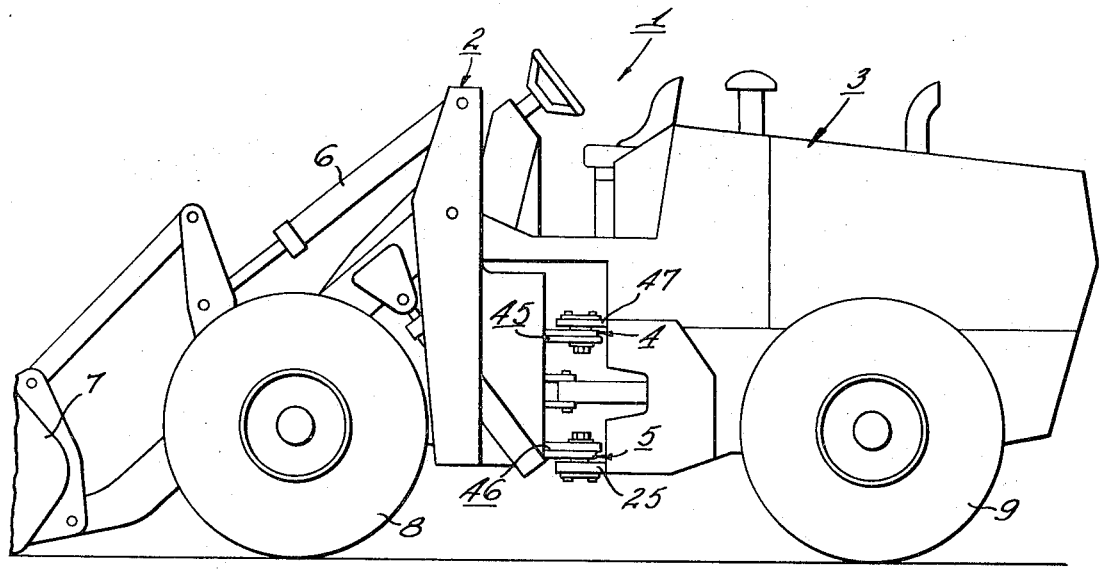
FIG. 1 illustrates a side elevation view of an articulated vehicle having two bearing assemblies pivotally connecting the fore and aft sections of the articulated vehicle.

Referring to the drawings the articulated vehicle is shown in FIG. 1. The articulated vehicle 1 includes the forward section 2 and the rearward section 3 pivotally connected by the upper bearing assembly 4 and the lower bearing assembly 5. The forward section 2 includes a suitable linkage 6 for operation of the bucket attachment 7 to provide front-end loading implementation. A pair of front wheels 8 support the front section 2. The rear section 3 is supported on a pair of rear wheels 9 and carries the engine for driving the vehicle and suitable power transmission for driving the front-end loader.

Since the bearing assembly 4 and the bearing assembly 5 are symmetrical except that the upper bearing assembly 4 is inverted with respect to the lower bearing assembly 5 only a cross-section of the lower bearing assembly is shown. The front section 2 is shown supporting the tapered pin 10 which is fastened by means of the bolt 11 firmly seated on the washer 12. The head 13 of the bolt 11 is formed with a threaded central opening to receive the grease fitting 14. A central passage 15 extends downwardly from the threaded opening 16 to supply lubricating fluid to the compartment 17. The front section 2 forms a front main frame including the plates 18 and 19 which define a tapered surface 20 for mating a tapered surface 21 of the tapered pin 10. The tapered pin 10 extends downwardly to form a cylindrical surface 22 for receiving the convex bushing 23 which forms a cylindrical opening 24.

The rear section 3 includes the rear main frame 25. The bearing retainer 26 is fastened to the rear main frame 25 by means of a plurality of bolts 27. The bearing retainer defines a cylindrical recess 28 for receiving the concave bushing 29. The bushing 23 forms a spherical surface segment 31 which is complementary to the spherical segment surface 32 defined by the concave bushing 29. Accordingly, it can be seen that the bearing assembly 5 forms a self-aligning bearing which reacts to both radial and axial thrust loading from the vehicle which together with the reaction forces produced in the bearing assembly 4 maintain a fixed alignment of the articulated sections 2 and 3 of the vehicle 1.

The tapered pin 10 defines a radial facing 33 while the convex bushing also defines a radial facing 34. An annular flexible member 35 is positioned between the surface 33 and the surface 34 and is retained in the position shown in the bearing assembly. The flexible sealing element 35 can flex axially to accommodate any tilting or slight misalignment of the axis of the tapered pin relative to the cylindrical recess 28 on the retainer 26 on the rear frame 25. The flexing characteristic of the sealing element 35 maintains contact by the axial portion 38 of the flexible member 35 engaging retainer 26. The flexible seal element 35 is preferably made of metal or some material which retains its stiffness to maintain the contact on the annular facing 39. To assure continuous contact of the end facing of the axial portion 38 a resilient member 40 is positioned immediately between the sealing element 35 engaging the plate 19 of the front frame of the articulated forward section 2 of the vehicle 1.

Accordingly, the flexible sealing element 35 defines a sealed compartment 17 which encloses the bushings 23 and 29 and excludes foreign material from the compartment which may be damaging to the bearing assembly. Lubrication is supplied through the grease fitting 14 to maintain lubrication of the bearing.

Figure 2:
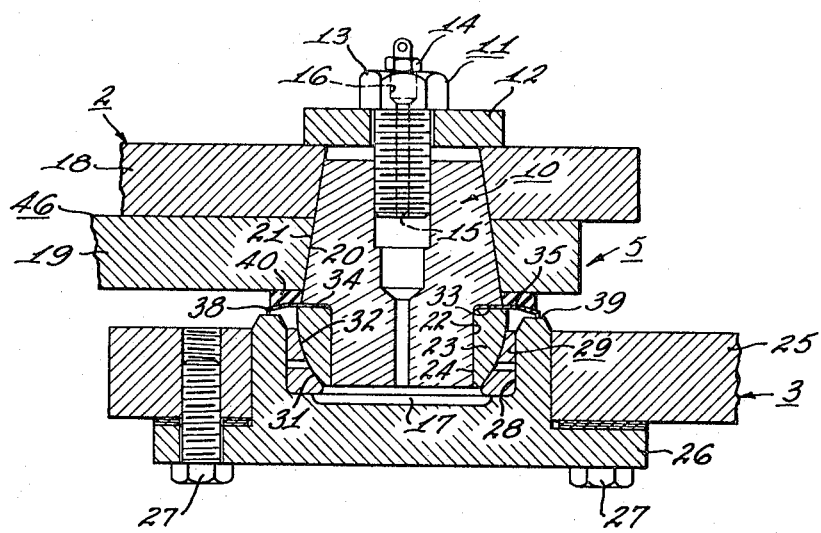
FIG. 2 illustrates a cross-section view of the lower bearing assembly which is structurally the same as the upper bearing assembly.

This device operates in the following described manner. The bearing assemblies 4 and 5 are positioned on the vehicle with a bearing retainer 26 as shown in FIG. 2 positioned on the lower side of bearing 5 and likewise a similar bearing retainer 26 is positioned from the upper side on the bearing assembly 4 which maintains the bearing assemblies in their assembled position. With this means of assembly the two arms 45 and 46 of the front main frame are positioned intermediate the two arms 47 and 25 of the rear main frame. The segments of spherical surfaces defined by the upper bearing assembly 4 and the lower bearing assembly 5 maintain the bearing assemblies in their fixed position and provide radial and axial thrust loadings to provide the alignment of both bearing assemblies and articulation of the vehicle. Referring to the lower bearing assembly shown in FIG. 2 the flexible element 35 is firmly seated against the radial facing 33 of the tapered pin 10 and the radial facing 34 of the convex bushing 23. The flexible seal element 35 is flexed slightly to maintain a firm seating on the annular surface 39 of the bearing retainer 26. The resilient member 40 firmly engages the plate 19 and presses downwardly on the upper surface of the flexible element 35 to maintain a firm contact of the end of the axial portion 38 of the sealing element 35. This forms a sealed compartment 17 which encloses the bushings 23 and 29.

The fitting 14 is adapted for supplying lubrication through the passage 15 which is in communication with the compartment 17. Accordingly, lubrication of the bearing assembly is provided through the fitting 14 when the equipment is serviced.

The embodiments of the invention in which an exclusive property or privilege is claimed are defined as follows:

1. An articulated vehicle bearing pivotally connecting first and second sections of an articulated vehicle comprising, a bearing support means on the first of said vehicle sections partially forming a bearing chamber, a pin means, means on the second of said vehicle sections connected to said pin means, a first bushing defining a segment of a spherical surface mounted on said bearing support means, a complementary bushing mounted on said pin means defining a segment of a spherical surface engaging the segment of spherical surface of said first bushing, a flexible seal member including an annular mounting portion resiliently positioned on said pin means and complementary bushing, an axial sealing portion on said seal member biased to sealingly engage said bearing support means and thereby form a sealed bearing compartment for said bushings.

2. An articulated vehicle bearing pivotally connecting first and second sections of an articulated vehicle as set forth in claim 1, including resilient means on the second of said vehicle sections biasing said flexible seal member to firmly engage said bearing support means on said first section of said articulated vehicle.

3. An articulated vehicle bearing pivotally connecting first and second sections of an articulated vehicle as set forth in claim 1 including means defining a lubricating passage for supplying lubrication to said bearing compartment.

4. An articulated vehicle bearing pivotally connecting first and second sections of an articulated vehicle as set forth in claim 1 wherein said annular mounting portion of said flexible seal member defines a radial flange integral with an axial flange defined by said axial sealing portion.

5. An articulated vehicle bearing pivotally connecting first and second sections of an articulated vehicle as set forth in claim 1 wherein said first bushing defines a concave bushing, said complementary bushing defines a convex bushing.

6. An articulated vehicle bearing pivotally connecting first and second sections of an articulated vehicle as set forth in claim 1 wherein said bearing support means defines an annular recess, said first bushing being received in said annular recess.

7. An articulated vehicle bearing pivotally connecting first and second sections of an articulated vehicle as set forth in claim 1 wherein said complementary bushing defines a radial facing, said pin means connected to said second section of said articulated vehicle defines a second radial facing, said radial facings engaging said flexible sealing member to retain said flexible seal member in its assembled position.

8. An articulated vehicle bearing pivotally connecting first and second sections of an articulated vehicle as set forth in claim 1, including two bearing assemblies pivotally connecting said sections wherein the first bearing assembly defines a segement of a spherical surface extending downwardly and the second of said bearing assemblies defines a segment of a spherical surface extending upwardly to firmly seat said bearings in assembled relationship on said vehicle sections.

9. An articulated vehicle bearing pivotally connecting first and second sections of an articulated vehicle as set forth in claim 1 wherein said pin means defines a tapered pin on the second of said sections, means defining a cylindrical surface on the end of said tapered pin, said complementary bushing defining a cylindrical opening for reception on said cylindrical surface of said tapered pin to thereby pivotally connect said first section and said second section through said bearing.

10. An articulated vehicle bearing pivotally connecting first and second sections of an articulated vehicle as set forth in claim 1 wherein said pin means defines a tapered pin connected to said second section of said articulated vehicle engaging said mounting portion of said flexible seal member.

* * * * *